United States Patent [19]

Gefvert

[11] Patent Number: 4,855,114

[45] Date of Patent: Aug. 8, 1989

[54] DIOXIME KINETIC ENHANCER FOR SOLVENT EXTRACTION OF GALLIUM FROM BASIC AQUEOUS SOLUTIONS THEREOF

[75] Inventor: David L. Gefvert, Dublin, Ohio

[73] Assignee: Sherex Chemical Company, Inc., Dublin, Ohio

[21] Appl. No.: 252,562

[22] Filed: Sep. 30, 1988

[51] Int. Cl.$^4$ .............................................. C01G 15/00
[52] U.S. Cl. ..................... 423/112; 423/126; 423/131; 423/624; 423/DIG. 14; 75/101 BE
[58] Field of Search ............... 423/112, 126, 131, 624, 423/DIG. 14; 210/688, 912; 75/101 BE

[56] References Cited

U.S. PATENT DOCUMENTS

| | | | |
|---|---|---|---|
| 3,971,843 | 7/1976 | Helgorsky et al. | 423/112 |
| 4,051,230 | 9/1977 | Miyauchi | 423/112 |
| 4,169,130 | 9/1979 | Helgorsky et al. | 423/112 |
| 4,241,029 | 12/1980 | Helgorsky et al. | 423/112 |
| 4,468,374 | 8/1984 | Kataoka et al. | 423/112 |
| 4,485,076 | 11/1984 | Bauer et al. | 423/112 |
| 4,559,203 | 12/1985 | Bauer et al. | 423/112 |
| 4,587,106 | 5/1986 | Bauer et al. | 423/112 |
| 4,666,686 | 5/1987 | Krajewski et al. | 423/112 |
| 4,741,887 | 5/1988 | Coleman et al. | 423/112 |
| 4,759,917 | 7/1988 | Coleman et al. | 423/112 |

FOREIGN PATENT DOCUMENTS

| | | | |
|---|---|---|---|
| 58-7412 | 1/1983 | Japan | 423/112 |
| 58-96831 | 6/1983 | Japan | 423/112 |
| 59-50024 | 3/1984 | Japan | 423/112 |
| 9186683 | 7/1984 | Japan | 423/112 |
| 9134780 | 8/1984 | Japan | 423/112 |

Primary Examiner—Robert L. Stoll
Assistant Examiner—Paige C. Harvey
Attorney, Agent, or Firm—Mueller and Smith

[57] ABSTRACT

Disclosed is a process for recovering gallium values contained in a basic aqueous solution by liquid/liquid extraction thereof. The liquid/liquid extraction process comprises contacting the basic aqueous solution with a water-immiscible, organic phase comprising a substituted hydroxyquinoline dissolved in an organic solvent therefor whereby gallium is extracted into the organic phase. Thereafter, the organic phase is separated from the basic aqueous phase and the gallium recovered from the separated organic phase. The improvement in process of the present invention comprises the organic phase further comprising dissolved therein an organic dioxime compound.

7 Claims, No Drawings

DIOXIME KINETIC ENHANCER FOR SOLVENT EXTRACTION OF GALLIUM FROM BASIC AQUEOUS SOLUTIONS THEREOF

BACKGROUND OF THE INVENTION

The present invention relates to the recovery of gallium values from Bayer process liquors by liquid/liquid extraction and more particularly to an additive which enhances the kinetics of the gallium extraction.

U.S. Pat. No. 3,971,843 describes a process for recovering gallium from basic aqueous alkaline solutions thereof by means of a liquid/liquid extraction process utilizing certain substituted hydroxyquinoline chelating agents. The basic aqueous alkaline solutions also contain certain compounds of aluminum and sodium and are typified by sodium aluminate lyes originating from the Bayer process. Such gallium recovery method includes a liquid/liquid extraction stage, a separation stage, and a regeneration stage wherein the gallium is recovered by means of strong acids and the organic extraction phase regenerated for recycle.

A variety of acids have been proposed in the regeneration step of the process, depending upon the specific process configuration elected to be employed. These acids include, for example, hydrochloric, sulfuric, nitric, and hydrobromic acids.

In the gallium extraction stage, organic solvents for the substituted hydroxyquinoline reagents preferably are utilized. The art teaches organic solvents including long chain alcohols, e.g. n-decanol or isodecanol, various heavy phenols, and certain phosphoric esters, such as tributyl phosphate. The concentration of the substituted hydroxyquinoline reagents in the organic phase have efficacy at concentrations as low as 1% by volume and can range on up to 50% by volume of the organic phase. Typical concentrations, though, range from about 6% to 12% by volume in commercial operations.

Elevated extraction temperatures also have been shown to aid in the process, such temperatures ranging up to 100° C. with 50°-80° C. being taught in the art to be preferred. So-called "decomposed" Bayer process liquids generally are treated in industrial practice. Such decomposed liquids are at a temperature in the vicinity of 50° C.

The caustic sodium aluminate lyes from the Bayer process generally have a composition ranging from about 100–400 g/l $Na_2O_3$ and 40–150 g/l $Al_2O_3$, while typical "decomposed" liquors that industry prefers for solvent extraction of gallium range from about 150–200 g/l in $Na_2O_3$ and about 70–100 g/l $Al_2O_3$. Gallium levels in the "decomposed" liquor can range from as low as 80 to as much as 300 ppm gallium, though gallium levels can vary greatly depending upon the particular bauxite source used in the process.

A variety of kinetic rate enhancers or additives have been proposed in the art to be combined with the substituted hydroxyquinoline reagents. For example, U.S. Pat. No. 4,241,029 proposes the use of organic carboxylic acid compounds. U.S. Pat. No. 4,485,076 proposes the use of organo sulfates or sulfonates containing at least one acid functionality. U.S. Pat. No. 4,559,203 proposes the use of an organophosphorous compound with at least one acid functionality. U.S. Pat. No. 4,169,130, on the other hand, proposes to conduct the extraction step of the process under an inert gas atmosphere.

BROAD STATEMENT OF THE INVENTION

The present invention is directed to a process for recovering gallium values contained in a basic aqueous solution by liquid/liquid extraction thereof. The liquid/liquid extraction process comprises contacting the basic aqueous solution with a water-immiscible, organic phase comprising a substituted hydroxyquinoline dissolved in an organic solvent therefor whereby gallium is extracted into the organic phase. Thereafter, the organic phase is separated from the basic aqueous phase and the gallium recovered from the separated organic phase. The improvement in process of the present invention comprises the organic phase further comprising dissolved therein an organic dioxime compound. The rate of extraction of gallium values from the basic aqueous solution is improved utilizing the dioxime additive compared to the organic phase devoid of the organic dioxime additive.

Advantages of the present invention include the ability to decrease contact time without sacrificing gallium recovery, resulting in the ability to use smaller extraction circuits. Another advantage includes the lowering of organic solvent required by virtue of the improved extraction kinetics realized by use of the organic dioxime agents. These and other advantages will be readily apparent to those skilled in the art based on the disclosure contained herein.

DETAILED DESCRIPTION OF THE INVENTION

Desirably, the dioxime kinetic enhancer will be soluble in the organic extracting phase for simplifying commercial implementation of the gallium extraction process. However, it should be noted that dioximes which form separate phases from the organic extraction phase still can improve the gallium recovery process at the expense of handling difficulties encountered by virtue of the presence of an additional phase during the process. Accordingly, dioxime kinetic enhancers preferably will be sufficiently soluble in the organic extraction phase so that no phase separation results. Since the hydroxyquinoline chelating agents are soluble in a variety of organic solvents ranging from aliphatic hydrocarbons to aromatic hydrocarbons to chlorinated hydrocarbons to fatty alcohols, the dioxime kinetic enhancer necessarily must be evaluated with specific reference to the solvent of choice selected for dissolving the hydroxyquinoline chelating agent. Most dioximes, then, will have a chain length of greater than $C_8$ and typically greater than $C_{10}$. Manufacturing costs as well as synthesis facileness play a role in dioxime selection. While it is presently preferred that the oxime groups be attached to adjacent carbon atoms, the examples will demonstrate that such adjacency is not mandatory for the dioxime kinetic enhancer to exhibit efficacy in improving the gallium liquid/liquid extraction process.

The dioxime kinetic enhancers can be straight chain, branched chain, alicyclic, and even may contain other functionality which does not interfere with the extraction process. In this connection, the examples will demonstrate that at least one hydroxy mono-oxime evaluated was ineffective in enhancing the gallium recovery process. Thus, it is believed that multiple oxime groups are required in order for the kinetic enhancement to occur. Suitable dioximes evaluated successfully in the process, include, for example dodecane 5,6-dioxime; 7-ethyl undecane 2,4-dioxime; and 3,5-dipropyl cyclohex-3,5-diene 1,2-dioxime. The proportion of dioxime kinetic enhancer should be at least about 1% by volume of the organic extraction phase on up to about 10% or greater.

Suitable substituted hydroxyquinoline chelating agents employed in gallium extraction processes include those disclosed in U.S. Pat. No. 3,971,843. Among the substituted hydroxyquinolines disclosed therein, the following are taught as being particularly suitable: alpha-alkenylhydroxy-8-quinolines, beta-alkenylhydroxy-8-quinolines, and alkylhydroxy-8-quinolines. Further details on hydroxy quinoline reagents for this process can be found in the citations referred to above.

The amount of substituted hydroxyquinoline in the organic phase is not critical and may vary within wide limits as taught in the art. Amounts of between about 1 and 50% by volume of the volume of the organic phase, though, generally is indicated by the art as being suitable with amounts ranging from between about 6 and 12 percent being economically favorable. Typical organic solvents taught in the art in making the organic phase include, for example, heptane, benzene, toluene, xylene, chloroform, dichloroethane, trichloropropane, and $C_8$-$C_{22}$ alkanols.

The liquid/liquid process is carried out in traditional fashion on aqueous caustic liquors resulting from the Bayer process and preferably utilizing typical "decomposed" liquors. The process is carried out in conventional fashion under gallium liquid/liquid extraction conditions including those represented in the art cited herein. Recovery of the gallium from the separated organic phase utilizing strong acids with recycle of the organic phase also is practiced conventionally.

The following examples show how the present invention can be practiced, but should not be construed as limiting. In this application, all percentages and proportions are by volume, and all units are in the metric system, unless otherwise expressly indicated. Also, all citations referred to herein are expressly incorporated herein by reference.

IN THE EXAMPLES

EXAMPLE 1

A Bayer caustic liquor having a composition of 72 g/l $Al_2O_3$, 120 g/l $Na_2O$, and 220 mg/l Ga was mixed at about 50° C. for five minutes with an extraction phase composed of kerosene containing 10% Kelex 100 chelating agent (a β-alkenyl-hydroxy-8-quinoline regent, Sherex Chemical Company, Dublin, Ohio), 15% tridecyl alcohol, and 5% of the following dodecane 5,6-dioxime kinetic enhancer:

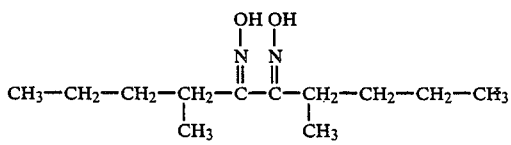

Thereafter, the organic extraction phase was stripped with 200 g/l $H_2SO_4$ and the stripped extraction phase mixed with fresh Bayer liquor. This cycle was repeated four times. Comparative tests omitting only the dioxime kinetic enhancer also were conducted. The following results were recorded.

TABLE 1

| No. of Contacts | Ga Extraction (%) | |
|---|---|---|
| | With Dioxime | Without Dioxime |
| 1 | 56 | 24 |
| 2 | 72 | 30 |
| 3 | 63 | 26 |
| 4 | 85 | 33 |

When tested alone, the dioxime compound did not extract gallium from the Bayer liquor. Accordingly, the above-tabulated results demonstrate that the dioxime tested is effective as a kinetic enhancer for the extraction of gallium utilizing the substituted hydroxyquinoline chelating agent tested.

It should be noted that additional candidate kinetic agents were tested, but found unsuitable with respect to their ability to extract gallium. These additional candidates were tested in the same formulation described above. Such candidate compounds included a methyl tridecyl amine quaternary compound, a cocobetaine, a sulfobetaine, a tallow amide, a primary amine, a diketone, a tallow nitrile, and a secondary amine amide. Moreover, a hydroxy mono-oxime compound additionally showed essentially no improvement as a kinetic enhancer. Among nitrogenous compounds, then, dioximes appear to be somewhat unique in their ability to enhance the kinetics of gallium extraction from Bayer caustic liquors.

A dioxime with the structure set forth below additionally was tested with Kelex 100 agent at the 5% level. At one cycle, 70% of the gallium was extracted from the caustic liquor.

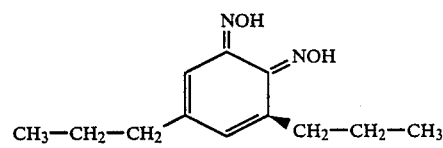

While the foregoing cyclic dioxime displayed improvement in gallium extraction (70% versus 30% for Kelex 100 alone), phase separation was severe enough to make this cyclic dioxime probably unsuitable for commercial utilization. Nevertheless, the dioxime functionality again was demonstrated as effective in improving gallium extraction.

EXAMPLE 2

A series of tests were run to determine the effect different levels of dioxime kinetic enhancer have on the gallium extraction process. The procedure described in Example 1 was repeated, except that the level of dioxime varied. The following results were recorded:

TABLE 2

| % Dioxime | Ga Extraction (%) |
|---|---|
| 0 | 23 |
| 0.5 | 21 |
| 1 | 22 |
| 3 | 38 |
| 5 | 78 |

The foregoing results appear to show that ever increasing levels of dioxime kinetic enhancer impart improved gallium extraction. This data also appears to show that higher levels may be required in order to optimize the process.

EXAMPLE 3

In this example, the Bayer caustic liquor was extracted with the organic extraction phase of Example 1 along with a comparative extraction which omitted the dodecane 6,7-dioxime kinetic enhancer. The amount of gallium extraction was measured as a function of contact time at the standard 1500 rpm agitation level standardized for use in all examples. The following results were recorded:

TABLE 3

| Contact Time (mins) | Ga Extraction (%) With Dioxime | Ga Extraction (%) Without Dioxime |
| --- | --- | --- |
| 5 | 77 | 43 |
| 10 | 84 | 60 |
| 20 | 82 | 77 |
| 40 | * | 86 |
| 60 | * | 91 |

* Stirrer broke.

These data establish that the dioxime kinetic enhancer is effective as a kinetic or rate enhancer in the extraction of gallium from aqueous Bayer caustic liquors.

EXAMPLE 4

In this example, runs were conducted utilizing the extraction phase of Example 1, a second extraction phase where the dioxime kinetic enhancer was 7-ethyl undecane 2,4-dioxime, and a comparative run where the dioxime was omitted. The temperature for the runs reported in this example were measured at between 57° and 59° C. The following results were recorded:

TABLE 4

| Kinetic Enhancer | Ga Extraction (%) |
| --- | --- |
| Comparative | 40 |
| Dodecane 6,7-dioxime | 62 |
| 7-ethyl undecane 2,4-dioxime | 54 |

The foregoing data again demonstrates that dioximes are effective as kinetic enhancers in the extraction of gallium from Bayer caustic process liquors. This data also shows that a dioxime compound containing nonadjacent oxime groups functions as a kinetic enhancer as does the dioxime having adjacent oxime groups as reported in the previous examples.

I claim:

1. In a process for recovering gallium values contained in a basic aqueous solution by liquid/liquid extraction thereof comprising contacting the basic aqueous solution with a water-immiscible, organic phase comprising a substituted hydroxyquinoline dissolved in an organic solvent therefor, whereby gallium is extracted into the organic phase; separating the organic phase from the basic aqueous phase; and recovering gallium from said separated organic phase, the improvement which comprises: the organic phase further comprising dissolved therein an organic dioxime compound.

2. The process of claim 1 wherein said dioxime compound is selected from the group consisting of dodecane 5,6-dioxime; 7-ethyl undecane 2,4-dioxime; 3,5-dipropyl cyclohex-3,5-diene 1,2-dioxime; and mixtures thereof.

3. The method of claim 1 wherein said dioxime compound is present from between about 1% and 10% by volume of said organic phase.

4. The method of claim 1 wherein said hydroxyquinoline is selected from the group consisting of alpha-alkenyl-hydroxy-8-quinolines, betaalkenyl-hydroxy-8-quinolines, alkyl-hydroxy-8-quinolines, and mixtures thereof.

5. The method of claim 1 wherein the proportion of hydroxyquinoline ranges from between about 1% and 50% by volume of the volume of the organic phase.

6. The method of claim 1 wherein the organic solvent is selected from the group consisting of an aliphatic hydrocarbon, an aromatic hydrocarbon, a chlorinated hydrocarbon, a fatty alcohol, and mixtures thereof.

7. The method of claim 6 wherein said organic solvent is selected from the group consisting of heptane, benzene, toluene, xylene, chloroform, carbon tetrachloride, dichloroethane, dichloropropane, $C_8$–$C_{22}$ alkanols, and mixtures thereof.

* * * * *